United States Patent
Cosper et al.

(10) Patent No.: US 12,409,908 B2
(45) Date of Patent: Sep. 9, 2025

(54) ELECTRIC BICYCLE, CONTROL SYSTEM OF ELECTRIC BICYCLE AND CONTROL METHOD THEREOF

(71) Applicant: SUITAI ELECTRONIC LTD., New Taipei (TW)

(72) Inventors: James Darrel Cosper, New Taipei (TW); James Raymond Cosper, New Taipei (TW)

(73) Assignee: SUITAI ELECTRONIC LTD., New Taipei (TW)

( * ) Notice: Subject to any disclaimer, the term of this patent is extended or adjusted under 35 U.S.C. 154(b) by 735 days.

(21) Appl. No.: 17/752,808

(22) Filed: May 24, 2022

(65) Prior Publication Data
US 2023/0234671 A1 Jul. 27, 2023

(30) Foreign Application Priority Data
Jan. 24, 2022 (TW) .................................. 111102832

(51) Int. Cl.
*B62M 6/50* (2010.01)
(52) U.S. Cl.
CPC ..................... *B62M 6/50* (2013.01)
(58) Field of Classification Search
CPC ................ B62M 6/50; B62J 45/411
See application file for complete search history.

(56) References Cited

U.S. PATENT DOCUMENTS

2007/0097538 A1* 5/2007 Lee ..................... G11B 5/5508
2018/0275628 A1* 9/2018 Tazawa ............... H02P 23/0004

FOREIGN PATENT DOCUMENTS

| CN | 1410318 A | 4/2003 |
| CN | 106985820 A | 7/2017 |

* cited by examiner

*Primary Examiner* — Richard M Camby
(74) *Attorney, Agent, or Firm* — Li & Cai Intellectual Property Office (57) ABSTRACT

An electric bicycle, a control system of the electric bicycle and a control method thereof are provided. The control system includes a pedal torque sensor, a micro-control circuit, a motor driver and a motor. The pedal torque sensor senses a plurality of pedal torques during a traveling period of the electric bicycle. The micro-control circuit is electrically connected to the pedal torque sensor and saves a reference pedal force. The micro-control circuit calculates an average pedal force based on the plurality of pedal torques and the traveling period, and generates a control signal based on a comparison result of the reference pedal force and the average pedal force. The motor driver is electrically connected to the micro-control circuit and generates a motor driving signal according to the control signal. The motor generates a motor output torque according to the motor driving signal.

8 Claims, 7 Drawing Sheets

ELECTRIC BICYCLE, CONTROL SYSTEM OF ELECTRIC BICYCLE AND CONTROL METHOD THEREOF

CROSS-REFERENCE TO RELATED PATENT APPLICATION

This application claims the benefit of priority to Taiwan Patent Application No. 111102832, filed on Jan. 24, 2022. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to an electric bicycle, a control system of the electric bicycle and a control method thereof, and more particularly to an electric bicycle, a control system of the electric bicycle and a control method thereof that can improve the comfort of riding the electric bicycle.

BACKGROUND OF THE DISCLOSURE

In recent years, more and more people pay attention to their own health. As such, an electric bicycle has become a means of transportation for many office workers. At present, the electric bicycle available on the market mainly utilizes an internal gear shifting mechanism to facilitate rotation of its rear wheel, so as to drive the electric bicycle to move.

When the internal gear shifting mechanism is adjusted to a low speed gear, the speed of the electric bicycle is slowed down, but a rider can save his/her energy during riding. Conversely, when the internal gear shifting mechanism is adjusted to a high speed gear, the speed of the electric bicycle becomes faster, but riding such a bicycle is more strenuous for the rider.

Since the current internal gear shifting mechanism is bulky and heavy, a factory operator experiences difficulty in assembling the internal gear shifting mechanism to the electric bicycle. In addition, due to the excessive volume and weight of the internal gear shifting mechanism, reducing the weight of the electric bicycle is a goal that is difficult to achieve.

SUMMARY OF THE DISCLOSURE

In response to the above-referenced technical inadequacies, the present disclosure provides an electric bicycle, a control system of the electric bicycle and a control method thereof.

In one aspect, the present disclosure provides a control system of an electric bicycle. The control system includes a pedal torque sensor, a micro-control circuit, a motor driver and a motor. The pedal torque sensor is configured to sense a plurality of pedal torques during a traveling period of the electric bicycle. The micro-control circuit is electrically connected to the pedal torque sensor and saves a reference pedal force. The micro-control circuit calculates an average pedal force based on the plurality of pedal torques and the traveling period of the electric bicycle, and generates a control signal based on a comparison result of the reference pedal force and the average pedal force. The motor driver is electrically connected to the micro-control circuit and generates a motor driving signal according to the control signal. The motor is electrically connected to the motor driver and generates a motor output torque according to the motor driving signal.

In another aspect, the present disclosure provides a control method of a control system of an electric bicycle. The control method includes: sensing a plurality of pedal torques during a traveling period of the electric bicycle; generating an average pedal force according to the plurality of pedal torques and the traveling period of the electric bicycle; comparing the average pedal force with a reference pedal force to generate a control signal; generating a motor driving signal according to the control signal; and generating a motor output torque according to the motor driving signal.

In yet another aspect, the present disclosure provides an electric bicycle. The electric bicycle includes a control stem, a seat, a pedal assembly, a rear wheel assembly, a pedal torque sensor, a micro-control circuit, a motor driver and a motor. A first bracket is connected between the seat and the control stem. A second bracket is connected between the rear wheel assembly and the pedal assembly. The pedal torque sensor is assembled with the pedal assembly and is configured to sense a plurality of pedal torques during a traveling period of the electric bicycle. The micro-control circuit is assembled in the first bracket and is electrically connected to the pedal torque sensor. The micro-control circuit saves a reference pedal force. The micro-control circuit calculates an average pedal force based on the plurality of pedal torques and the traveling period of the electric bicycle and generates a control signal based on a comparison result of the reference pedal force and the average pedal force. The motor driver is assembled in the first bracket and is electrically connected to the micro-control circuit. The motor driver generates a motor driving signal according to the control signal. The motor is assembled with the rear wheel assembly and is electrically connected to the motor driver. The motor generates a motor output torque according to the motor driving signal.

Therefore, in the electric bicycle, the control system of the electric bicycle and the control method thereof provided by the present disclosure, when the electric bicycle travels in different road conditions, the control system of the electric bicycle constantly monitors pedal forces of a rider and adaptively adjusts the motor output torque of the motor to maintain a comfortable riding effort over varying road conditions. In this way, even if the rider rides the electric bicycle on roads of various conditions, the rider can still apply a fixed force to pedals, thereby improving the rider's comfort when riding the electric bicycle. In addition, through the control system of the electric bicycle, the electric bicycle no longer needs to be installed with an internal gear shifting mechanism, which allows the weight of the electric bicycle to be lighter. At the same time, complexities of assembly and maintenance can be decreased.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

In an electric bicycle, a control system of the electric bicycle and a control method thereof provided by the present disclosure, the control system monitors pedal forces applied to pedals of the electric bicycle in real time, so as to adjust a motor output torque of a motor. When the pedal forces applied to the pedal become greater, the motor output torque is increased. When the pedal forces applied to the pedal become smaller, the motor output torque is decreased. Since the motor output torque is appropriately adjusted according to the pedal forces applied to the pedal, the control system generates an appropriate auxiliary force, and a rider can apply a fixed force to the pedal when riding the electric bicycle in different road conditions. In this way, the rider can ride the electric bicycle in a more comfortable manner.

First Embodiment

Figure 1:
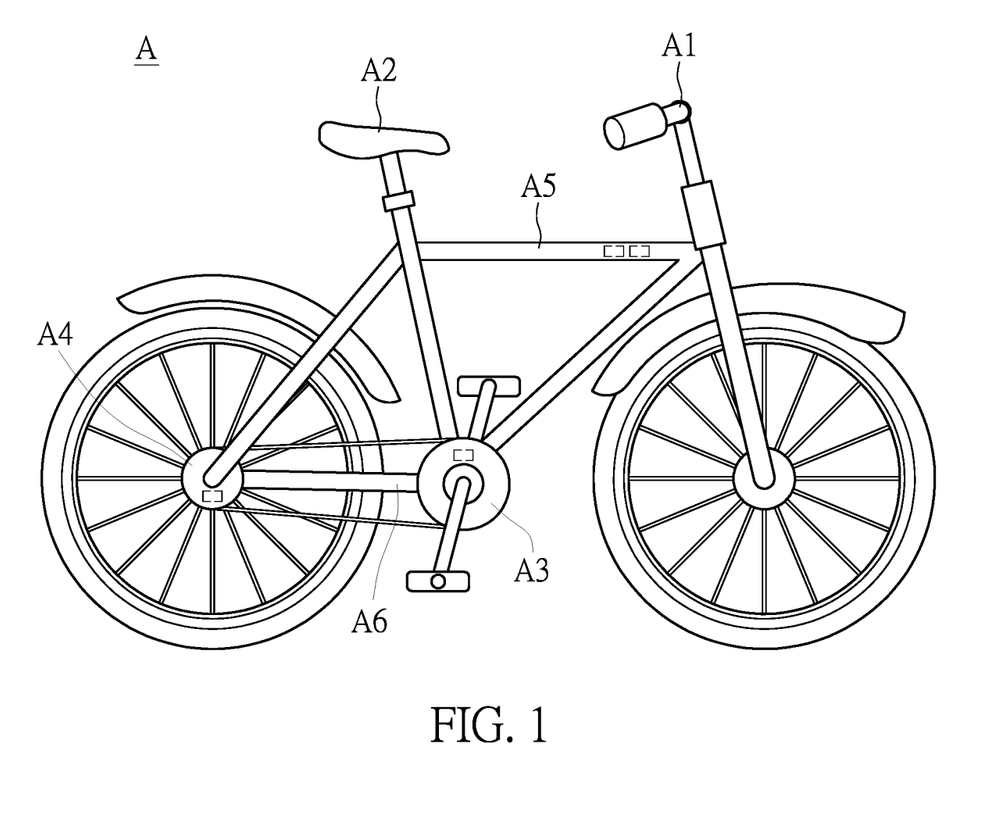
FIG. 1 is a schematic view of a control system of an electric bicycle according to one embodiment of the present disclosure.
Figure 2:
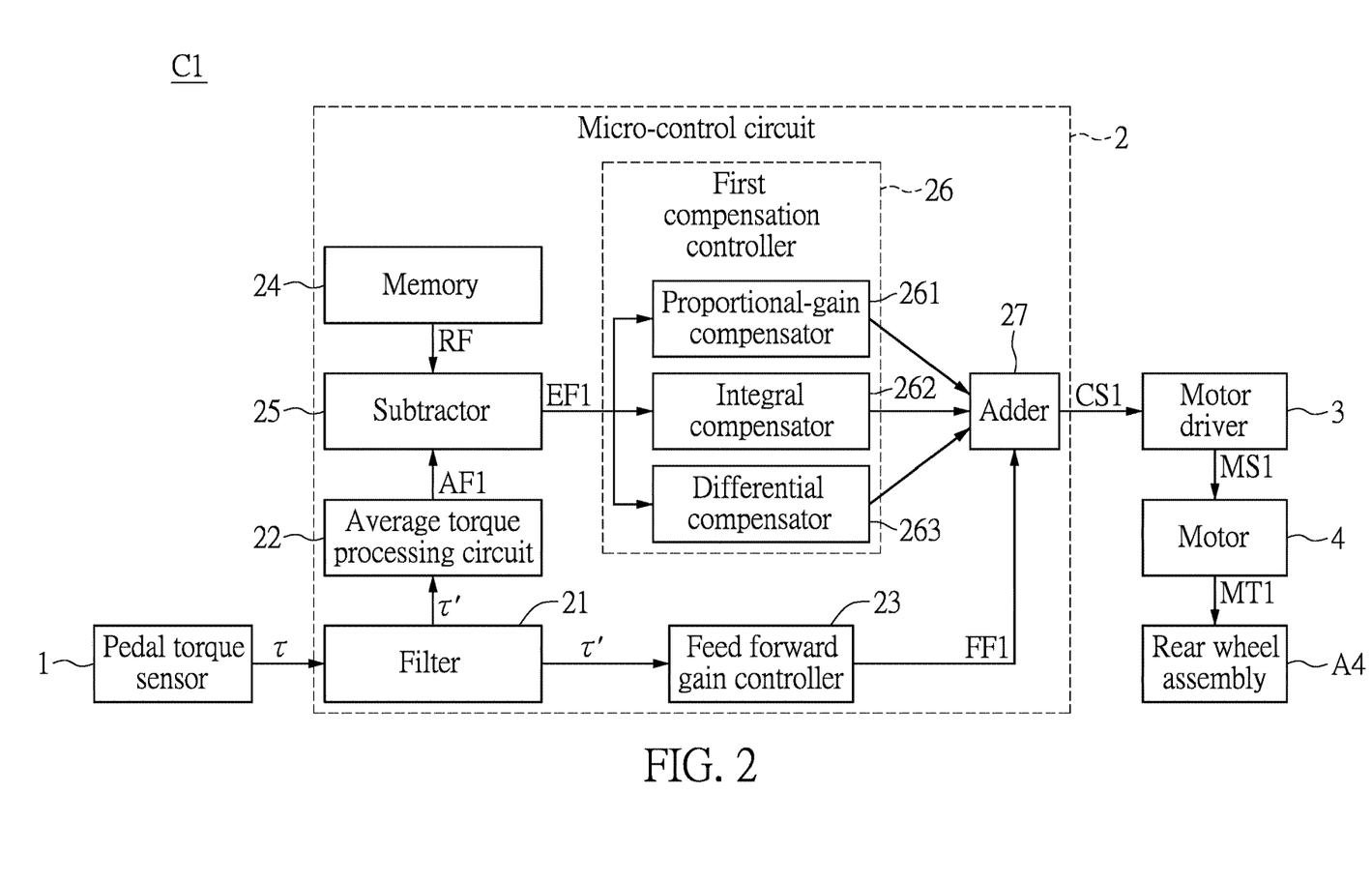
FIG. 2 is a functional block diagram of a control system of an electric bicycle according to a first embodiment of the present disclosure.

FIG. 1 is a schematic view of a control system of an electric bicycle according to one embodiment of the present disclosure, and FIG. 2 is a functional block diagram of a control system of an electric bicycle according to a first embodiment of the present disclosure. Referring to FIG. 1 and FIG. 2, an electric bicycle A includes a control stem A1, a seat A2, a pedal assembly A3 and a rear wheel assembly A4. A first bracket A5 is connected between the control stem A1 and the seat A2, and a second bracket A6 is connected between the pedal assembly A3 and the rear wheel assembly A4. A control system C1 of the electric bicycle A includes a pedal torque sensor 1, a micro-control circuit 2, a motor driver 3 and a motor 4. The pedal torque sensor 1 is assembled with the pedal assembly A3. When the rider applies a force to the pedal of the pedal assembly A3, a pedal torque is generated, and the pedal torque sensor 1 senses the pedal torque. The micro-control circuit 2 and the motor driver 3 are electrically connected to each other and assembled in the first bracket A5. The micro-control circuit 2 and the motor driver 3 can be electronic components that are separate from each other, or the micro-control circuit 2 and the motor driver 3 can be integrated into a system chip to reduce the complexity of assembly and maintenance. The motor 4 is assembled with the rear wheel assembly A4, which is used to drive a rear wheel of the electric bicycle A to rotate.

The schematic view of FIG. 1 is only an example. In other embodiments, the micro-control circuit 2 and the motor driver 3 can also be assembled in other brackets of the electric bicycle A. The motor 4 can be assembled with a front wheel assembly of the bicycle A, or the front wheel assembly and the rear wheel assembly 4 of the bicycle A are assembled with two motors, and the two motors are electrically connected to the micro-control circuit 2 and the motor driver 3.

Referring to FIG. 2, the pedal torque sensor 1 of the control system C1 of the electric bicycle A constantly senses a plurality of pedal torques τ during a traveling period of the electric bicycle A. The micro-control circuit 2 of the control system C1 includes a filter 21, an average torque processing circuit 22, a feed forward gain controller 23, a memory 24, a subtractor 25, and a first compensation controller 26, and an adder 27. The filter 21 of the micro-control circuit 2 is electrically connected to the pedal torque sensor 1. When the pedal torque sensor 1 senses the pedal torque τ each time, the filter 21 is used to filter noise of the pedal torque τ, so as to generate a filtered pedal torque τ'.

The average torque processing circuit 22 is electrically connected to the filter 21. The average torque processing circuit 22 includes a memory for saving the traveling period of the electric bicycle A and a calculation circuit. The average torque processing circuit 22 generates an average pedal force AF1 according to the traveling period of the electric bicycle A and the plurality of filtered pedal torques τ' generated by the filter 21.

The feed forward gain controller 23 is electrically connected to the filter 21, and the feed forward gain controller 23 multiplies the filtered pedal torque τ' by a feed forward gain (FGAIN) to generate a feed forward compensation part FF1 when the filter 21 generates the filtered pedal torque τ' each time.

The memory 24 is electrically connected to the subtractor 25, and the memory 24 saves a reference pedal force RF. The reference pedal force RF is a rider input stored in the memory 24 to set the amount of rider preferred effort, the reference pedal force RF is not a value calculated or measured. The subtractor 25 is further electrically connected to the average torque processing circuit 22, and the subtractor 25 subtracts the average pedal force AF1 generated by the average torque processing circuit 22 from the reference pedal force RF saved in the memory 24 to generate an error feedback signal EF1.

The first compensation controller 26 is a proportional-integral-derivative (PID) controller, and includes a proportional gain compensator 261, an integral compensator 262 and a differential compensator 263. The proportional gain compensator 261, the integral compensator 262 and the differential compensator 263 are each electrically connected to the subtractor 25. The proportional gain compensator 261 multiplies the error feedback signal EF1 by a proportional gain (Kp) to generate a proportional gain compensation part. The integral compensator 262 performs an integral process on the error feedback signal EF1 with respect to time for generation of an integral value, and multiplies the integral value by an integral gain (Ki) to generate an integral compensation part. The differential compensator 263 performs a differential process on the error feedback signal EF1 with respect to time for generation of a differential value, and multiplies the differential value by a differential gain (Kd) to generate a differential compensation part.

The adder 27 is electrically connected to the feed forward gain controller 23, the proportional gain compensator 261, the integral compensator 262 and the differential compensator 263. The adder 27 sums up the feed forward compensation part FF1 generated by the feed forward gain controller 23, the proportional gain compensation part generated by the proportional gain compensator 261, the integral compensation part generated by the integral compensator 262, and the differential compensation part generated by the differential compensator 263 to generate a control signal CS1.

The motor driver 3 of the control system C1 of the electric bicycle A is electrically connected to the adder 27 of the micro-control circuit 2. The motor driver 3 generates a motor driving signal MS1 according to the control signal CS1 generated by the micro-control circuit 2. The motor 4 of the control system C1 of the electric bicycle A is electrically connected to the motor driver 3. The motor 4 generates a motor output torque MT1 according to the motor driving signal MS1 generated by the motor driver 3, so as to drive the rear wheel of the rear wheel assembly A4 of the electric bicycle A to rotate.

For example, when the electric bicycle A travels on an uphill path, the rider of the electric bicycle A usually applies a larger force to the pedal of the electric bicycle A. When the force becomes greater, the pedal torque τ of the pedal becomes larger. When the pedal torque sensor 1 of the control system C1 detects that the pedal torque τ becomes larger, the control system C1 increases the motor output torque MT1 of the motor 4. In this way, the rider can apply less force to the pedal and ride the electric bicycle in a more comfortable manner.

Conversely, when the uphill path is changed to a downhill path or a flat surface, the rider usually applies a smaller force to the pedal. Since the force becomes smaller, the pedal torque τ becomes smaller. When the pedal torque sensor 1 of the control system C1 detects that the pedal torque τ becomes smaller, the motor output torque MT1 of the motor 4 is decreased.

Figure 3:
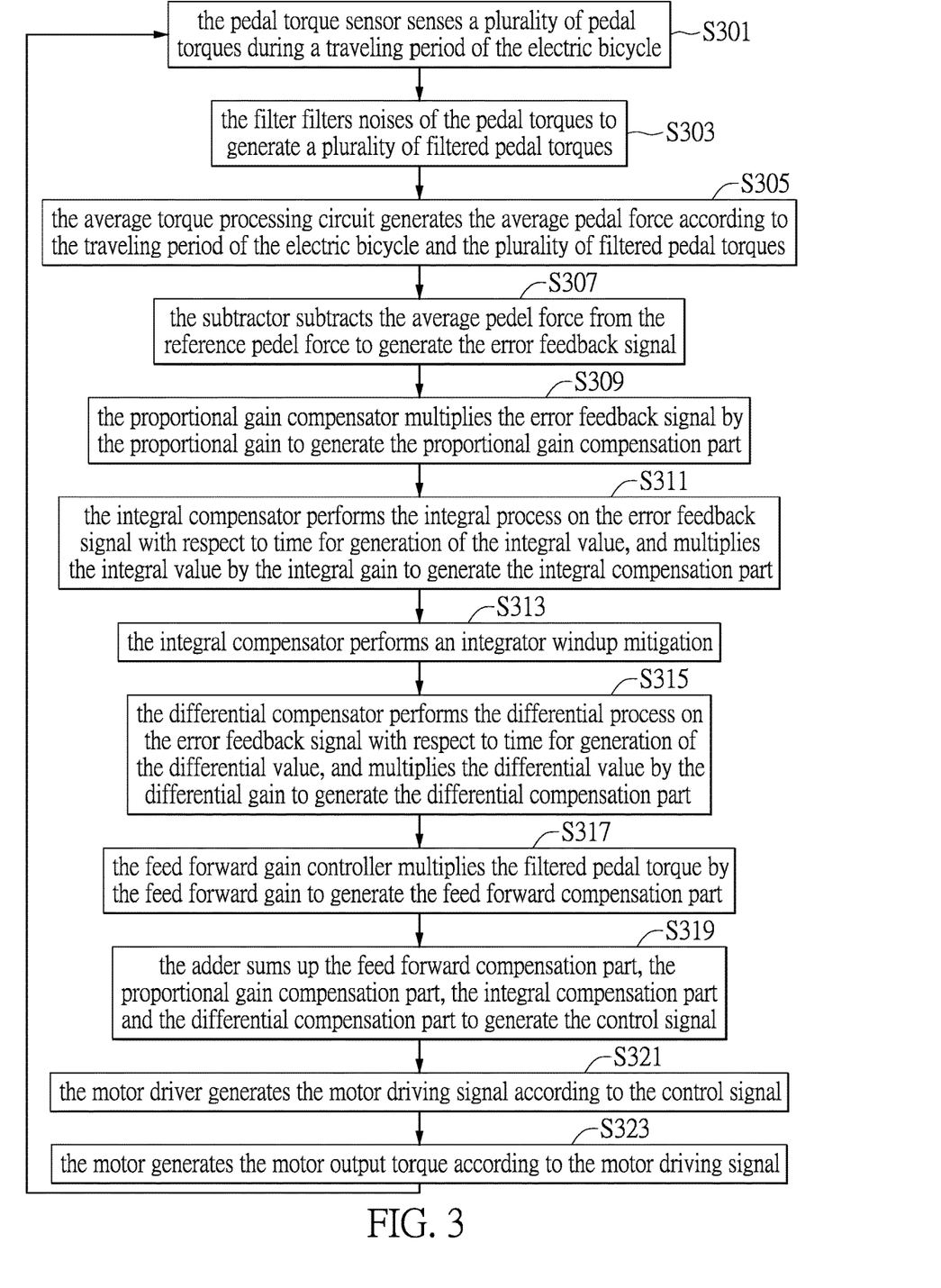
FIG. 3 is a flowchart of a control method of the control system of FIG. 2.

FIG. 3 is a flowchart of a control method of the control system of FIG. 2. Referring to FIG. 2 and FIG. 3, in a step S301, the pedal torque sensor 1 senses a plurality of pedal torques τ during a traveling period of the electric bicycle A. The step S301 is followed by a step S303. In the step S303, the filter 21 filters noises of the pedal torques τ to generate a plurality of filtered pedal torques τ'. The step S303 is followed by a step S305. In the step S305, the average torque processing circuit 22 generates the average pedal force AF1 according to the traveling period of the electric bicycle A and the plurality of filtered pedal torques τ'. The step S305 is followed by a step S307. In the step S307, the subtractor 25 subtracts the average pedal force AF1 from the reference pedal force RF to generate the error feedback signal EF1. The step S307 is followed by a step S309.

In the step S309, the proportional gain compensator 261 multiplies the error feedback signal EF1 by the proportional gain (Kp) to generate the proportional gain compensation part. The step S309 is followed by a step S311. In the step S311, the integral compensator 262 performs the integral process on the error feedback signal EF1 with respect to time for generation of the integral value, and multiplies the integral value by the integral gain (Ki) to generate the integral compensation part. The step S311 is followed by a step S313. In the step S313, the integral compensator 262 performs an integrator windup mitigation. The step S313 is followed by a step S315. In the step S315, the differential compensator 263 performs the differential process on the error feedback signal EF1 with respect to time for generation of the differential value, and multiplies the differential value by the differential gain (Kd) to generate the differential compensation part. The step S315 is followed by a step S317. In the step S317, the feed forward gain controller 23 multiplies the filtered pedal torque τ' by the feed forward gain (FGAIN) to generate the feed forward compensation part FF1. The step S317 is followed by a step S319. In the step S319, the adder 27 sums up the feed forward compensation part FF1, the proportional gain compensation part, the integral compensation part and the differential compensation part to generate the control signal CS1. The step S319 is followed by a step S321. In the step S321, the motor driver 3 generates the motor driving signal MS1 according to the control signal CS1. The step S321 is followed by a step S323. In the step S323, the motor 4 generates the motor output torque MT1 according to the motor driving signal MS1, and the control method returns to the step S301 after the step S323.

The error feedback signal EF1 is a difference between the average pedal force AF1 and the reference pedal force RF. When the error feedback signal EF1 is increased, the proportional gain compensation part, the integral compensation part, and the differential compensation part generated by the first compensation controller 26 are increased, thereby increasing a level of the control signal CS1. When the level of the control signal CS1 is increased, the motor output torque MT1 is also increased. Conversely, when the error feedback signal EF1 is decreased, the proportional gain compensation part, the integral compensation part, and the differential compensation part generated by the first compensation controller 26 are decreased, thereby decreasing the level of the control signal CS1. When the level of the control signal CS1 is decreased, the motor output torque MT1 is also decreased.

Second Embodiment

Figure 4:
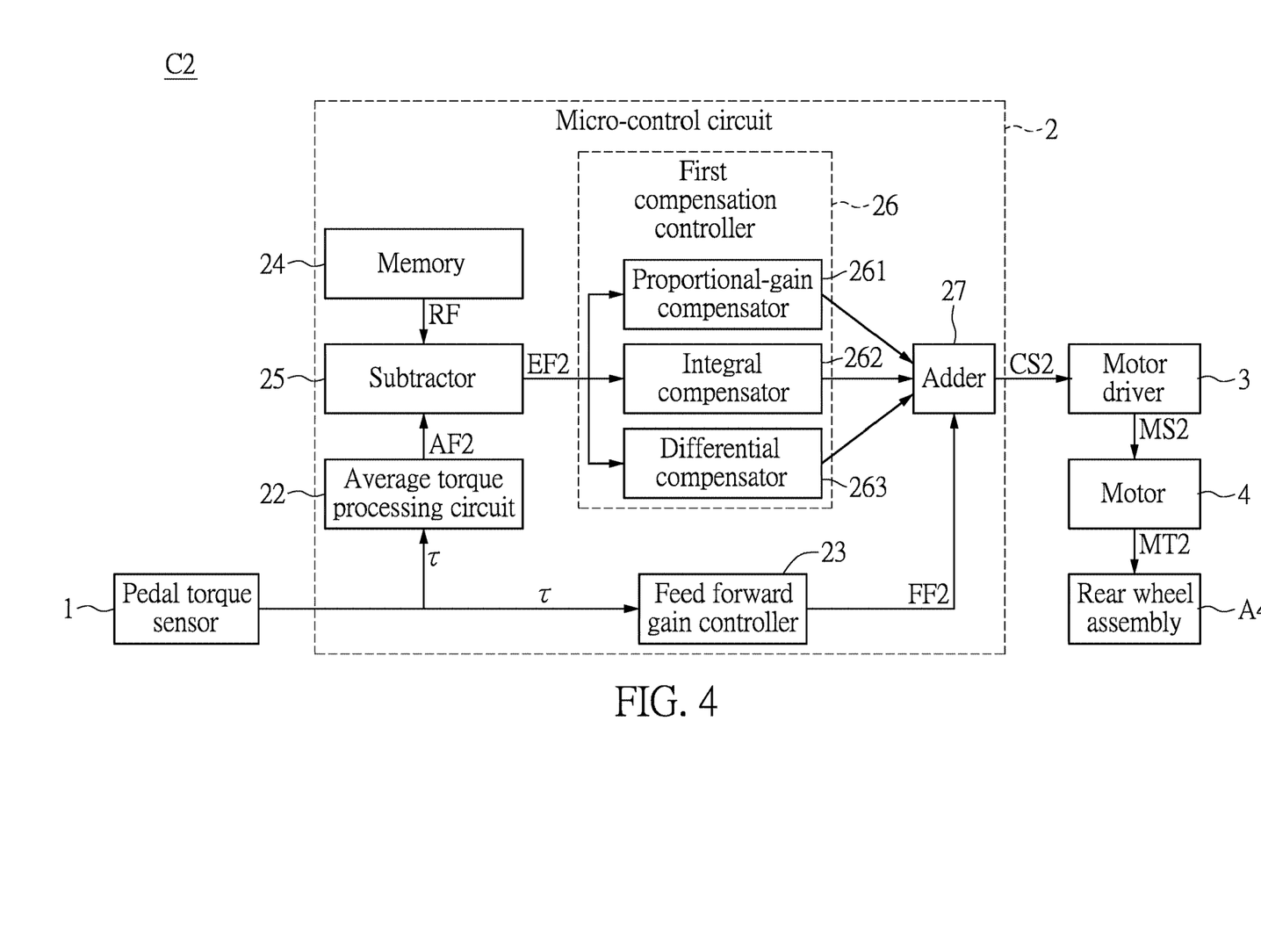
FIG. 4 is a functional block diagram of a control system of an electric bicycle according to a second embodiment of the present disclosure.

FIG. 4 is a functional block diagram of a control system of an electric bicycle according to a second embodiment of the present disclosure. A comparison is made between FIG. 4 and FIG. 2, and the main difference between the second embodiment and the first embodiment is as follows. In FIG. 4, a control system C2 of the second embodiment omits the filter 21, and the pedal torque sensor 1 is electrically connected to the feed forward gain controller 23 and the average torque processing circuit 22. The average torque processing circuit 22 generates an average pedal force AF2 according to the traveling period of the electric bicycle A and the plurality of pedal torques τ of the pedal torque sensor 1. The feed forward gain controller 23 multiplies the pedal torque τ by the feed forward gain (FGAIN) to generate a feed forward compensation part FF2. The adder 27 sums up the feed forward compensation part FF2 of the feed forward gain controller 23, the proportional gain compensation part of the proportional gain compensator 261, the integral compensation part of the integral compensator 262, and the differential compensation part of the differential compensator 263 to generate a control signal CS2. The motor driver 3 generates a motor driving signal MS2 according to the control signal CS2 of the micro-control circuit 2. The motor 4 generates a motor output torque MT2 according to the motor driving signal MS2 of the motor driver 3.

Figure 5:
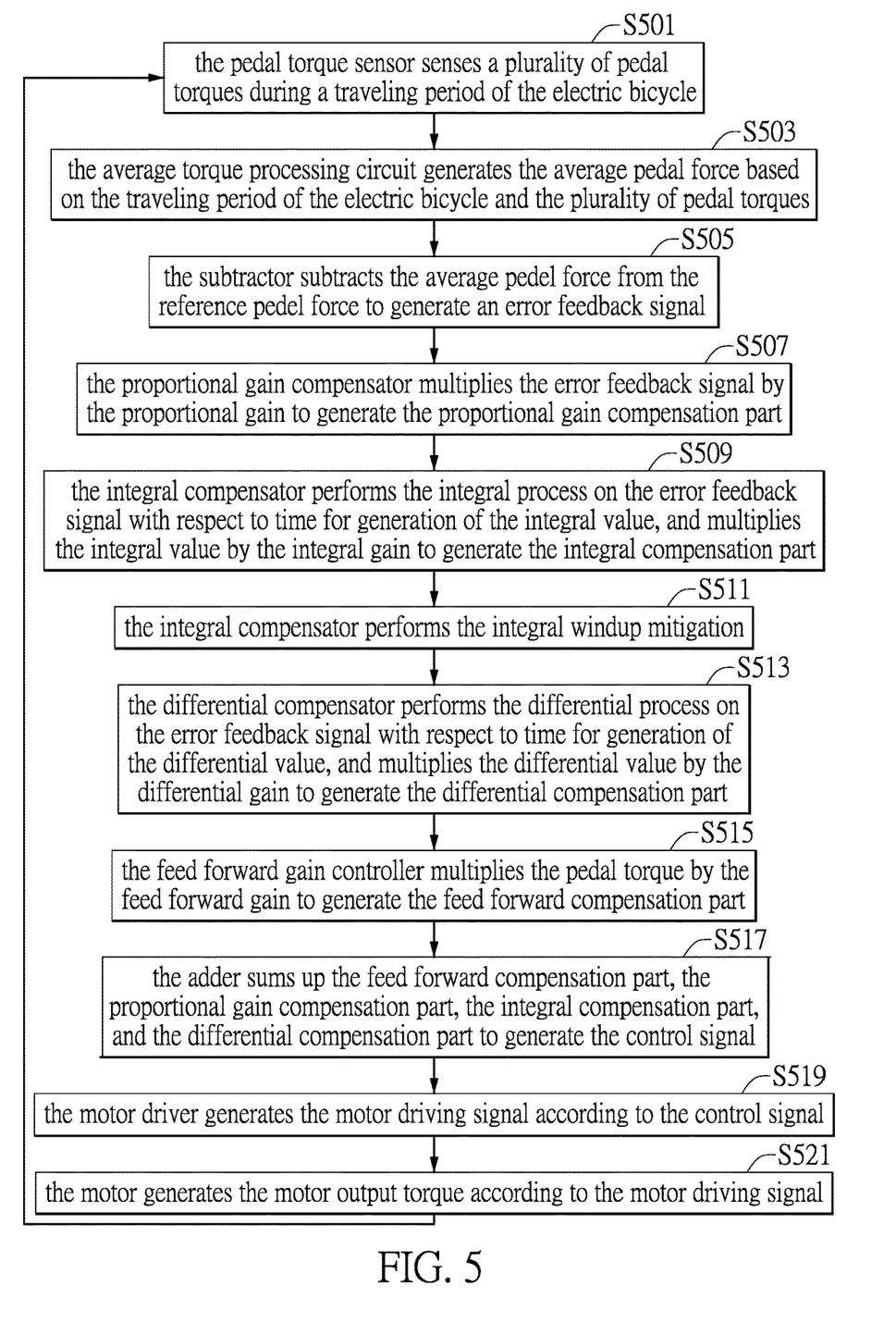
FIG. 5 is a flowchart of a control method of the control system of FIG. 4.

FIG. 5 is a flowchart of a control method of the control system of FIG. 4. Referring to FIG. 5, in a step S501, the pedal torque sensor 1 senses a plurality of pedal torques τ during the traveling period of the electric bicycle A. The step S501 is followed by a step S503. In the step S503, the average torque processing circuit 22 generates the average pedal force AF2 based on the traveling period of the electric bicycle A and the plurality of pedal torques τ. The step S503 is followed by a step S505. In the step S505, the subtractor 25 subtracts the average pedal force AF2 from the reference pedal force RF to generate an error feedback signal EF2. The step S505 is followed by a step S507.

In the step S507, the proportional gain compensator 261 multiplies the error feedback signal EF2 by the proportional gain Kp to generate the proportional gain compensation part. The step S507 is followed by a step S509. In the step S509, the integral compensator 262 performs the integral process on the error feedback signal EF2 with respect to time for generation of the integral value, and multiplies the integral value by the integral gain (Ki) to generate the integral compensation part. The step S509 is followed by a step S511. In the step S511, the integral compensator 262 performs the integral windup mitigation. The step S511 is followed by a step S513. In the step S513, the differential compensator 263 performs the differential process on the error feedback signal EF2 with respect to time for generation of the differential value, and multiplies the differential value by the differential gain (Kd) to generate the differential compensation part. The step S513 is followed by a step S515. In the step S515, the feed forward gain controller 23 multiplies the pedal torque τ by the feed forward gain (FGAIN) to generate the feed forward compensation part FF2. The step S515 is followed by a step S517. In the step S517, the adder 27 sums up the feed forward compensation part FF2, the proportional gain compensation part, the integral compensation part, and the differential compensation part to generate the control signal CS2. The step S517 is followed by a step S519. In the step S519, the motor driver 3 generates the motor driving signal MS2 according to the control signal CS2. The step S519 is followed by a step S521. In the step S521, the motor 4 generates the motor output torque MT2 according to the motor driving signal MS2. The control method returns to the step S501 after the step S521.

Third Embodiment

Figure 6:
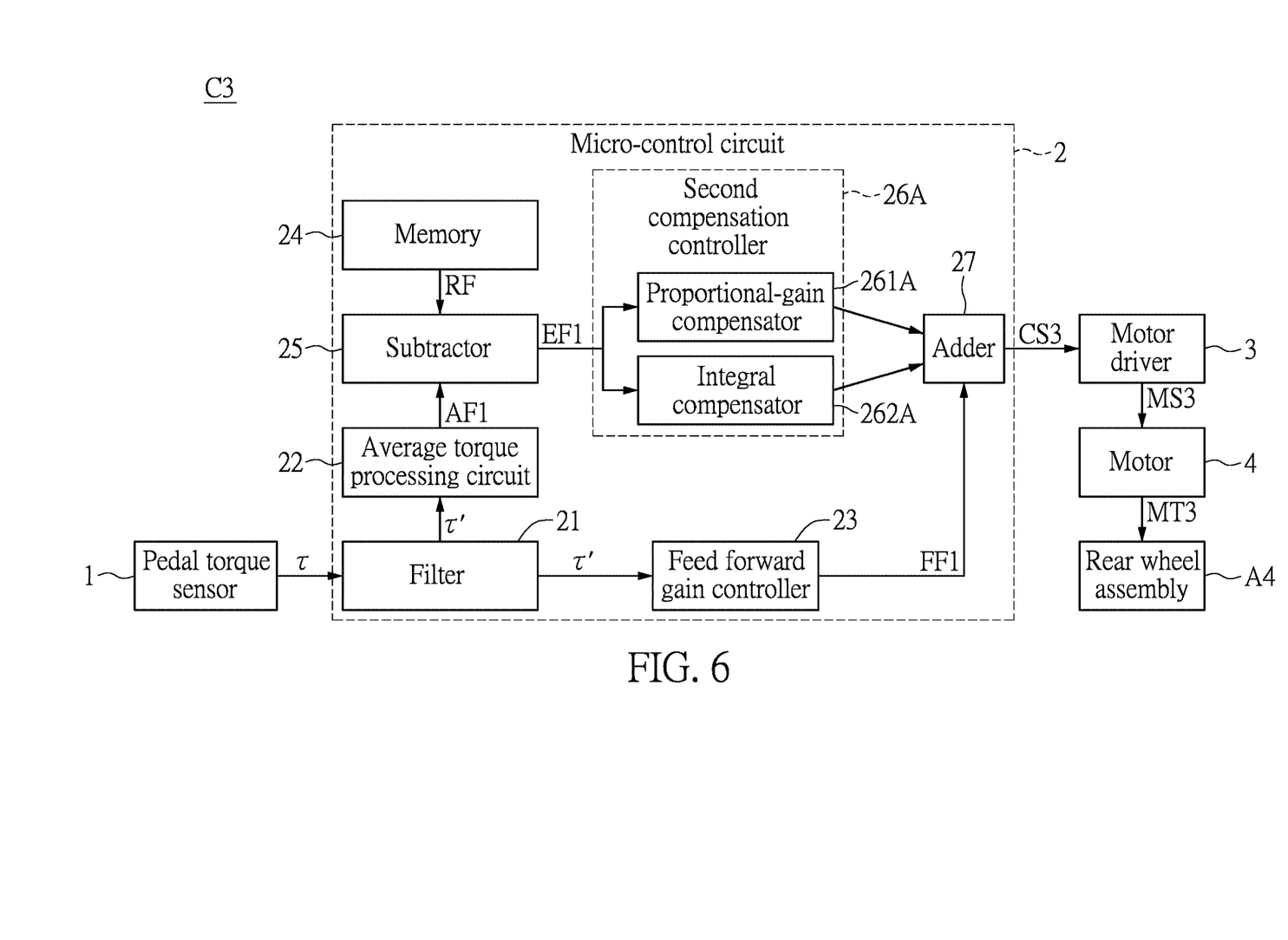
FIG. 6 is a functional block diagram of a control system of an electric bicycle according to a third embodiment of the present disclosure.

FIG. 6 is a functional block diagram of a control system of an electric bicycle according to a third embodiment of the present disclosure. A comparison is made between FIG. 6 and FIG. 2, and the main difference between the third embodiment and the first embodiment is as follows. In FIG. 6, a control system C3 of the third embodiment replaces the first compensation controller 26 of the control system C1 with a second compensation controller 26A. The second compensation controller 26A is a proportional-integral (PI) controller, and includes a proportional gain compensator 261A and an integral compensator 262A. The proportional gain compensator 261A and the integral compensator 262A are each electrically connected to the subtractor 25. The adder 27 is electrically connected to the feed forward gain controller 23, the proportional gain compensator 261A and the integral compensator 262A. The adder 27 sums up the feed forward compensation part FF1 of the feed forward gain controller 23, the proportional gain compensation part of the proportional gain compensator 261A and the integral compensation part of the integral compensator 262A to generate a control signal CS3. The motor driver 3 generates a motor driving signal MS3 according to the control signal CS3 of the micro-control circuit 2. The motor 4 generates a motor output torque MT3 according to the motor driving signal MS3 of the motor driver 3.

Fourth Embodiment

Figure 7:
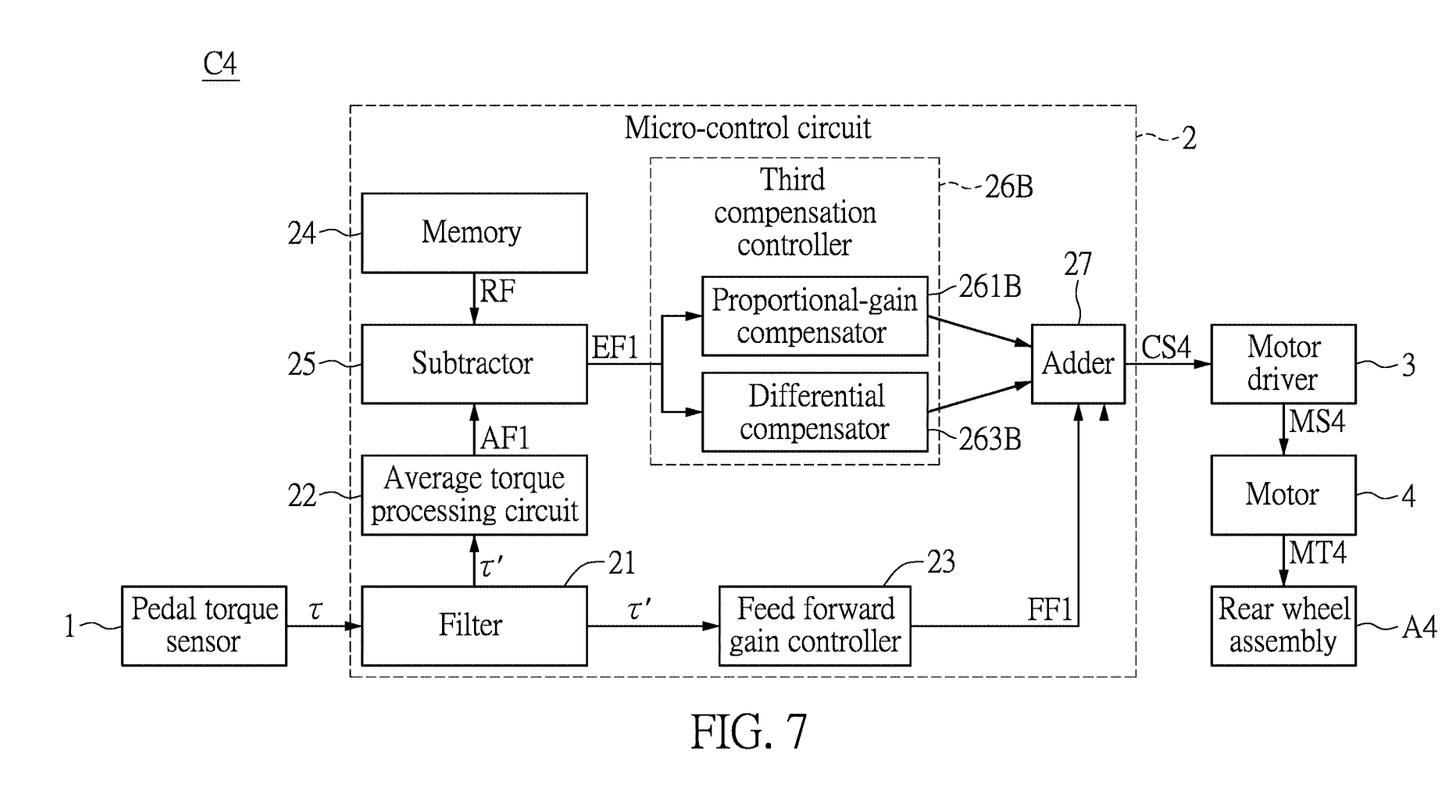
FIG. 7 is a functional block diagram of a control system of an electric bicycle according to a fourth embodiment of the present disclosure.

FIG. 7 is a functional block diagram of a control system of an electric bicycle according to a fourth embodiment of the present disclosure. A comparison is made between FIG. 7 and FIG. 2, and the main difference between the fourth embodiment and the first embodiment is as follows. In FIG. 7, a control system C4 of the fourth embodiment replaces the first compensation controller 26 of the control system C1 with a third compensation controller 26B. The third compensation controller 26B is a proportional-derivative (PD) controller, and includes a proportional gain compensator 261B and a differential compensator 263B. The proportional gain compensator 261B and the differential compensator 263B are each electrically connected to the subtractor 25. The adder 27 is electrically connected to the feed forward gain controller 23, the proportional gain compensator 261B and the differential compensator 263B. The adder 27 sums up the feed forward compensation part FF1 of the feed forward gain controller 23, the proportional gain compensation part of the proportional gain compensator 261B and the differential compensation part of the differential compensator 263B to generate a control signal CS4. The motor driver 3 generates a motor driving signal MS4 according to the control signal CS4 of the micro-control circuit 2. The motor 4 generates a motor output torque MT4 according to the motor driving signal MS4 of the motor driver 3.

However, the aforementioned details are disclosed for exemplary purposes only, and are not meant to limit the scope of the present disclosure.

Beneficial Effects of the Embodiments

In conclusion, in the electric bicycle, the control system of the electric bicycle and the control method thereof provided by the present disclosure, when the electric bicycle travels in different road conditions, the control system of the electric bicycle constantly monitors the pedal forces of the rider and adaptively adjusts the motor output torque of the motor to maintain a comfortable riding effort over varying road conditions. In this way, even if the rider rides the electric bicycle on roads of various conditions, the rider can still apply a fixed force to the pedals, thereby improving the rider's comfort when riding the electric bicycle. In addition, through the control system of the electric bicycle, the electric bicycle no longer needs to be installed with an internal shifting gear mechanism, which allows the weight of the electric bicycle to be lighter. At the same time, the complexity of assembly and maintenance can be decreased.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A control system of an electric bicycle, comprising:
    a pedal torque sensor configured to sense a plurality of pedal torques during a traveling period of the electric bicycle;
    a micro-control circuit electrically connected to the pedal torque sensor, wherein the micro-control circuit saves a reference pedal force; wherein the micro-control circuit calculates an average pedal force based on the plurality of pedal torques and the traveling period of the electric bicycle, and generates a control signal based on a comparison result of the reference pedal force and the average pedal force;
    a motor driver electrically connected to the micro-control circuit, wherein the motor driver generates a motor driving signal according to the control signal; and
    a motor electrically connected to the motor driver, wherein the motor generates a motor output torque according to the motor driving signal;
    wherein the micro-control circuit includes an average torque processing circuit, a subtractor and a compensation controller, the average torque processing circuit is electrically connected to the pedal torque sensor and the subtractor, the average torque processing circuit records the traveling period of the electric bicycle and generates the average pedal force according to the traveling period of the electric bicycle and the pedal torque, the subtractor subtracts the average pedal force from the reference pedal force to generate an error feedback signal, the compensation controller is a proportional-integral-derivative controller, the proportional-integral-derivative controller is electrically connected to the subtractor, and the proportional-integral-derivative controller generates a proportional gain compensation part, an integral compensation part and a differential compensation part according to the error feedback signal.

2. The control system according to claim 1, wherein the micro-control circuit increases a level of the control signal when a difference between the average pedal force and the reference pedal force is increased, and the motor output torque is increased when the level of the control signal is increased; wherein the micro-control circuit decreases the level of the control signal when the difference between the average pedal force and the reference pedal force is decreased, and the motor output torque is decreased when the level of the control signal is decreased.

3. The control system according to claim 1, wherein the micro-control circuit further includes a filter, a feed forward gain controller and an adder, the filter is electrically connected to the pedal torque sensor and the average torque processing circuit, the feed forward gain controller is electrically connected to the filter, the adder is electrically connected to the feed forward gain controller, the compensation controller and the motor driver, the feed forward gain controller generates a feed forward compensation part, and the adder sums up the proportional gain compensation part, the integral compensation part, the differential compensation part and the feed forward compensation part to generate the control signal.

4. A control method of a control system of an electric bicycle, comprising:
    sensing a plurality of pedal torques during a traveling period of the electric bicycle;
        generating an average pedal force according to the plurality of pedal torques and the traveling period of the electric bicycle;
        comparing the average pedal force with a reference pedal force to generate a control signal;
    generating a motor driving signal according to the control signal; and
    generating a motor output torque according to the motor driving signal;
    wherein the step of comparing the average pedal force with the reference pedal force to generate the control signal includes: subtracting the average pedal force from the reference pedal force to generate an error feedback signal: performing a proportional gain process on the error feedback signal to generate a proportional gain compensation part; performing an integral process on the error feedback signal to generate an integral compensation part; performing an integrator windup mitigation; and performing a differential process on the error feedback signal to generate a differential compensation part.

5. The control method according to claim 4, further comprising filtering noise of the pedal torque after sensing the pedal torque and before generating the average pedal force.

6. The control method according to claim 4, further comprising multiplying the pedal torque by a feed forward gain to generate a feed forward compensation part after generating the proportional gain compensation part, the integral compensation part and the differential compensation part; and summing up the proportional gain compensation part, the integral compensation part, the differential compensation part and the feed forward compensation part to generate the control signal.

7. An electric bicycle, comprising:
    a control stem;
    a seat, wherein a first bracket is connected between the seat and the control stem;
    a pedal assembly;
    a rear wheel assembly, wherein a second bracket is connected between the rear wheel assembly and the pedal assembly;

a pedal torque sensor assembled with the pedal assembly and configured to sense a plurality of pedal torques during a traveling period of the electric bicycle;

a micro-control circuit assembled in the first bracket and electrically connected to the pedal torque sensor, wherein the micro-control circuit saves a reference pedal force; wherein the micro-control circuit calculates an average pedal force based on the plurality of pedal torques and the traveling period of the electric bicycle, and generates a control signal based on a comparison result of the reference pedal force and the average pedal force;

a motor driver assembled in the first bracket and electrically connected to the micro-control circuit, wherein the motor driver generates a motor driving signal according to the control signal; and a motor assembled with the rear wheel assembly and electrically connected to the motor driver, wherein the motor generates a motor output torque according to the motor driving signal;

wherein the micro-control circuit includes an average torque processing circuit, a subtractor and a compensation controller, the average torque processing circuit is electrically connected to the pedal torque sensor and the subtractor, the average torque processing circuit records the traveling period of the electric bicycle and generates the average pedal force according to the traveling period of the electric bicycle and the pedal torque, the subtractor subtracts the average pedal force from the reference pedal force to generate an error feedback signal, the compensation controller is a proportional-integral-derivative controller, the proportional-integral-derivative controller is electrically connected to the subtractor, and the proportional-integral-derivative controller generates a proportional gain compensation part, an integral compensation part and a differential compensation part according to the error feedback signal.

8. The electric bicycle according to claim 7, wherein the micro-control circuit increases a level of the control signal when a difference between the average pedal force and the reference pedal force is increased, and the motor output torque is increased when the level of the control signal is increased; wherein the micro-control circuit decreases the level of the control signal when the difference between the average pedal force and the reference pedal force is decreased, and the motor output torque is decreased when the level of the control signal is decreased.

\* \* \* \* \*